United States Patent
Knauth et al.

(10) Patent No.: US 6,610,984 B2
(45) Date of Patent: Aug. 26, 2003

(54) METHOD AND APPARATUS FOR CORRECTION OF MICROBOLOMETER OUTPUT

(75) Inventors: Jonathan P. Knauth, Sauquoit, NY (US); Steven M. Balick, Rome, NY (US)

(73) Assignee: Infrared Components Corporation, Utica, NY (US)

( * ) Notice: Subject to any disclaimer, the term of this patent is extended or adjusted under 35 U.S.C. 154(b) by 0 days.

(21) Appl. No.: 09/809,554

(22) Filed: Mar. 15, 2001

(65) Prior Publication Data

US 2001/0040216 A1 Nov. 15, 2001

Related U.S. Application Data

(60) Provisional application No. 60/190,156, filed on Mar. 17, 2000.

(51) Int. Cl.[7] .................................................. G01J 5/02
(52) U.S. Cl. .................................... 250/352; 250/338.1
(58) Field of Search ........................ 250/252.1, 338.1, 250/352

(56) References Cited

U.S. PATENT DOCUMENTS

| | | | |
|---|---|---|---|
| 4,574,263 A | | 3/1986 | Liddiard |
| 4,990,782 A | | 2/1991 | Wellman et al. |
| 5,118,947 A | * | 6/1992 | Hamashima et al. ...... 250/338.1 |
| 5,300,915 A | | 4/1994 | Higashi et al. |
| 5,369,280 A | | 11/1994 | Liddiard |
| 5,763,885 A | * | 6/1998 | Murphy et al. .............. 250/332 |
| 5,811,808 A | * | 9/1998 | Cannata et al. .............. 250/332 |
| 6,144,031 A | | 11/2000 | Herring et al. |
| 6,274,869 B1 | * | 8/2001 | Butler ...................... 250/252.1 |
| 6,353,223 B1 | * | 3/2002 | Ookawa ................... 250/252.1 |

* cited by examiner

Primary Examiner—Constantine Hannaher
(74) Attorney, Agent, or Firm—August E. Roehrig, Jr.; Hancock & Estabrook, LLP

(57) ABSTRACT

A method and apparatus for correction of temperature-induced variations in the analog output characteristics of a microbolometer detector in an infrared detecting focal plane array utilizing electronic means to correct for the temperature variation of the individual microbolometer detector. The electronic circuitry and associated software necessary for implementation is also described.

26 Claims, 9 Drawing Sheets

METHOD AND APPARATUS FOR CORRECTION OF MICROBOLOMETER OUTPUT

This application claims benefit of our provisional application Ser. No. 60/190,156 filed Mar. 17, 2000.

BACKGROUND OF THE INVENTION

1. Technical Field

The present invention relates generally to very sensitive thermometric instruments, known as microbolometers, which are used for the detection and measurement of radiant energy. More specifically, the present invention addresses correction of microbolometer output.

2. Related Art

Infrared detectors known as microbolometers respond to impinging infrared radiation through subtle variations in the temperature of the detector element. The detector elements include a material having a high temperature coefficient of resistance (TCR) such that these subtle variations in the temperature of the detector may be sensed. The sensing methods often employed are based on the passing of a metered electrical current through the device and measuring the resulting voltage drop. Alternatively, the temperature of the detector may be sensed by biasing the detector circuit with a known voltage and measuring the resulting current. In the simplest embodiment, the microbolometer detector is connected to a meter, and the response of the meter can be correlated to the intensity of the impinging infrared radiation.

However, in typical applications for which an image is desired, a lens is employed to focus energy onto a two-dimensional array of microbolometer detectors such that a spatially varying infrared field can be detected and converted to visible imagery using electronics and display means such as are commonly employed for visible imagery using Charge-Coupled Device (CCD) cameras. The electronics typically include a multiplexing circuit in intimate contact with the microbolometer array which converts the voltage or current variation of the many microbolometer elements to one or several multiplexed analog (e.g., voltage variation) data streams. This analog data is then converted to digital data using an analog-to-digital converter (ADC), and is then further processed to produce data for analysis or imagery on a Cathode Ray Tube (CRT) or similar video monitor.

The fact that the detection means is based on the thermal variations of the detector causes several practical problems. First, the material must be thermally isolated from surrounding matter so that a sufficiently large (e.g., several mK) temperature variation may occur as a result of the weak impinging infrared energy. Liddiard, in U.S. Pat. Nos. 4,574,263 and 5,369,280, and Higashi, et al., in U.S. Pat. No. 5,300,915 describe a microbolometer that provides thermal isolation by depositing a semiconductor material onto a pellicle, or "micro-bridge" structure that physically separates the detector from the supporting substrate. Second, the temperature of the supporting substrate must be stable so that erroneous signals are not generated from its temperature fluctuations. Experience indicates that a 15 mK variation of substrate temperature within the sampling period (or video frame rate, whichever is greater) is acceptable, but fluctuations greater than this present a significant source of system noise. Third, the output of the microbolometer varies as a result of both the impinging infrared radiation, and the absolute temperature of the substrate. In this last case, the array output may be higher or lower at different temperatures, even if that temperature is held to within the stability requirement of 15 mK. Fourth, variations in the physical construction of the microbolometer detectors result in significant variations of the output of individual microbolometer detectors within the array, and these non-uniformities must be corrected in order to obtain a low-noise image.

As a result, there exists a need for an apparatus capable of correcting the output of a microbolometer, for example, in a focal plane array (FPA), such that the effects of thermal drift are removed or eliminated.

In the particular problem of thermal variation of the substrate, microbolometer detectors are operated at a fixed temperature, typically with a stability tolerance of ±0.015° C. (i.e., 15 mK). Peltier-junction heat engines and control circuitry are commonly employed for this purpose. While this temperature stabilization scheme works well, it is not the ideal solution. For instance, the temperature stabilization system represents a significant portion of the detector package cost. Further, it is susceptible to damage from shock or vibration, and ordinarily requires tens of seconds to reach operational temperature from system start-up. Also, the temperature stabilization means is a major consumer of system power.

Since the output of the microbolometer varies as a result of impinging infrared radiation, a number of additional noise sources and undesirable effects occur. Referring now to FIG. 7, the microbolometer is impinged by infrared radiation from the cold shield, 608a, the lens, 616a, the dewar window, 606a, as well as the signal 622a. If the temperature of the cold shield 608a, lens 616a and dewar window 606a remain constant, then variation in their radiant flux also remain constant. The microbolometer output voltage or current due to variations in the signal emanating from source 618a may then be determined by subtracting the fixed voltage or current offset arising from the impinging radiation from the cold shield, lens and dewar window. If, however, the temperature of the cold shield 608a, lens 616a and dewar window 606a vary more than a few degrees Celsius, a significant source of uncertainty in the microbolometer output, termed noise, is created.

Due to limitations in the input sensitivity range of the analog-to-digital converter (ADC), these noise sources may cause under or over saturation of the ADC, resulting in the loss of sensitivity to desired signal data. The radiant flux from the source may also vary more than the input sensitivity of the ADC permits, and loss of sensitivity to desired signal data may also result.

In the particular problem of modulating the detector's sensitivity to widely varying radiant flux from the source, several methods are typically employed to maximize dynamic range. The most common method is to insert a mechanical aperture stop within the system optical path to vignette energy and effectively change the focal ratio (or "f" number). However, this method requires mechanical components that are bulky, expensive and unreliable, and require the user to manually adjust the sensitivity. A better method is to vary the duty cycle of the detector by means of changing the time that the sensor is being sampled by the system electronics. This method is a distinct improvement over the manual method, but has the disadvantage of requiring a new calibration each time the sampling time is changed. While the calibrations can be stored in digital memory, the quantity of memory required and the number of calibrations that must be performed tend to increase system size and cost.

In the particular problem of correcting for thermal variations of the cold shield 608a, lens 616a and dewar window 606a, the most common method is to perform frequent system calibrations to eliminate these effects. Many thermal imaging systems have built-in motorized calibration sources for this purpose. However, calibrating the system frequently reduces the availability of the system for its intended use and consumes system power. Further, the motorized calibration source (shown as 630 and 631 in FIG. 6) decreases the reliability of the system due to its moving parts and increases manufacturing costs.

Therefore, there exists a need for an apparatus capable of correcting the output of a microbolometer, for example, in a focal plane array (FPA), such that the effects of thermal variations in the cold shield 608a, lens 616a and dewar window 606a are reduced or eliminated. This apparatus should also have the ability to modulate the sensitivity of the microbolometer to large variations in the radiant flux (signal) from the source so that the microbolometer output remains within the input sensitivity range of the ADC.

SUMMARY OF THE INVENTION

It is an advantage of the present invention to provide a system and method for correction of microbolometer output. For example, the present invention provides a method to eliminate the need for gross temperature stabilization of a microbolometer through the creation of a system that uses electronic means to correct the temperature variation of the microbolometer. An advantage of the present invention is that it eliminates the need for recalibration of a microbolometer appliance, for instance a microbolometer camera, should the temperature of the focal plane array in the camera change from the temperature for which it was calibrated. Further, rapid system readiness is possible since thermal stabilization of the focal plane array is not necessary. Specifically, this invention conditions the multiplexed output of a microbolometer focal plane array so that the peak-to-peak voltage of the analog signal is within the range of an analog-to-digital converter's input sensitivity at any arbitrary temperature between approximately −10° C. and 50° C.

A further general aspect of this invention is to provide a method of correcting the output of a microbolometer detector system, said method comprising: providing a microbolometer detector system for operation in an ambient temperature range, said microbolometer detector system further comprising at least one microbolometer detector, and an apparatus for reducing thermal noise; providing a temperature stabilization system for correcting the temperature variation of the microbolometer detector; providing an electronic system for conditioning the output of the microbolometer detector; and applying a correction factor to the output signal of the microbolometer detector.

A second general aspect of the present invention is to provide a method of correcting the output of a microbolometer detector system, said method comprising: providing a microbolometer detector system for operation in an ambient temperature range, said microbolometer detector system further comprising at least one microbolometer detector, and an apparatus for reducing thermal noise; providing a temperature stabilization system for correcting the temperature variation of the microbolometer detector; providing an electronic system for conditioning the output of the microbolometer detector; providing a system for varying the responsivity of the microbolometer; applying a correction factor to the output signal of the microbolometer detector.

A third general aspect of the present invention is to provide an apparatus for correction of a microbolometer detector output, said apparatus comprising: at least one microbolometer detector; a thermal noise reduction system operationally connected to said at least one microbolometer detector; an electrical reference circuit connected to said at least one microbolometer detector; an output from said electrical reference circuit connected to an input of a signal conditioning circuit; and an output from said signal conditioning circuit connected to a display device.

A fourth general aspect of this invention is to provide a method for modulating the sensitivity of a microbolometer by conditioning the multiplexed output of a microbolometer focal plane array so that the peak-to-peak voltage of the analog signal is within the range of an analog-to-digital converter's input sensitivity at any arbitrary sampling time.

A fifth general aspect of this invention is to provide a method for correcting the output of a microbolometer to reduce or eliminate the effects of variation in the temperature of the cold shield, dewar window and lens.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Although certain preferred embodiments of the present invention will be shown and described in detail, it should be understood that various changes and modifications may be made without departing from the scope of the present invention. The scope of the present invention will in no way be limited to the number of constituting components, the materials thereof, the shapes thereof, the relative arrangement thereof, etc., which are disclosed simply as an example of the preferred embodiments.

Infrared energy focused on a two-dimensional microbolometer detector focal plane array (FPA) produces an output that varies from detector to detector within the plurality of detectors that form the array. Even when the energy emitted by a spatially and temporally uniform object is focused on the FPA, the several microbolometer detectors comprising the array provide significantly different outputs. This is due to several factors, including the nature of the energy distribution focused on the focal plane array by the optical system, which typically follows a $\cos^n\theta$ profile (where n is a number between 2 and 4, depending on the optical system design), and fabrication variations from detector to detector. These two factors (optical energy variations and manufacturing tolerances) are collectively known as "fixed pattern noise."

Fixed pattern noise can be corrected through a calibration method that entails focusing a spatially uniform energy field on a microbolometer detector array, determining the average response of the array, and then calculating the amount that the output of each microbolometer varies from the average. This data is stored in random access memory (RAM) tables for future array output corrections. The non-uniformity correction values are applied at several different stages in the signal processing chain. An example of the signal processing chain is shown in FIG. 1.

Figure 1:
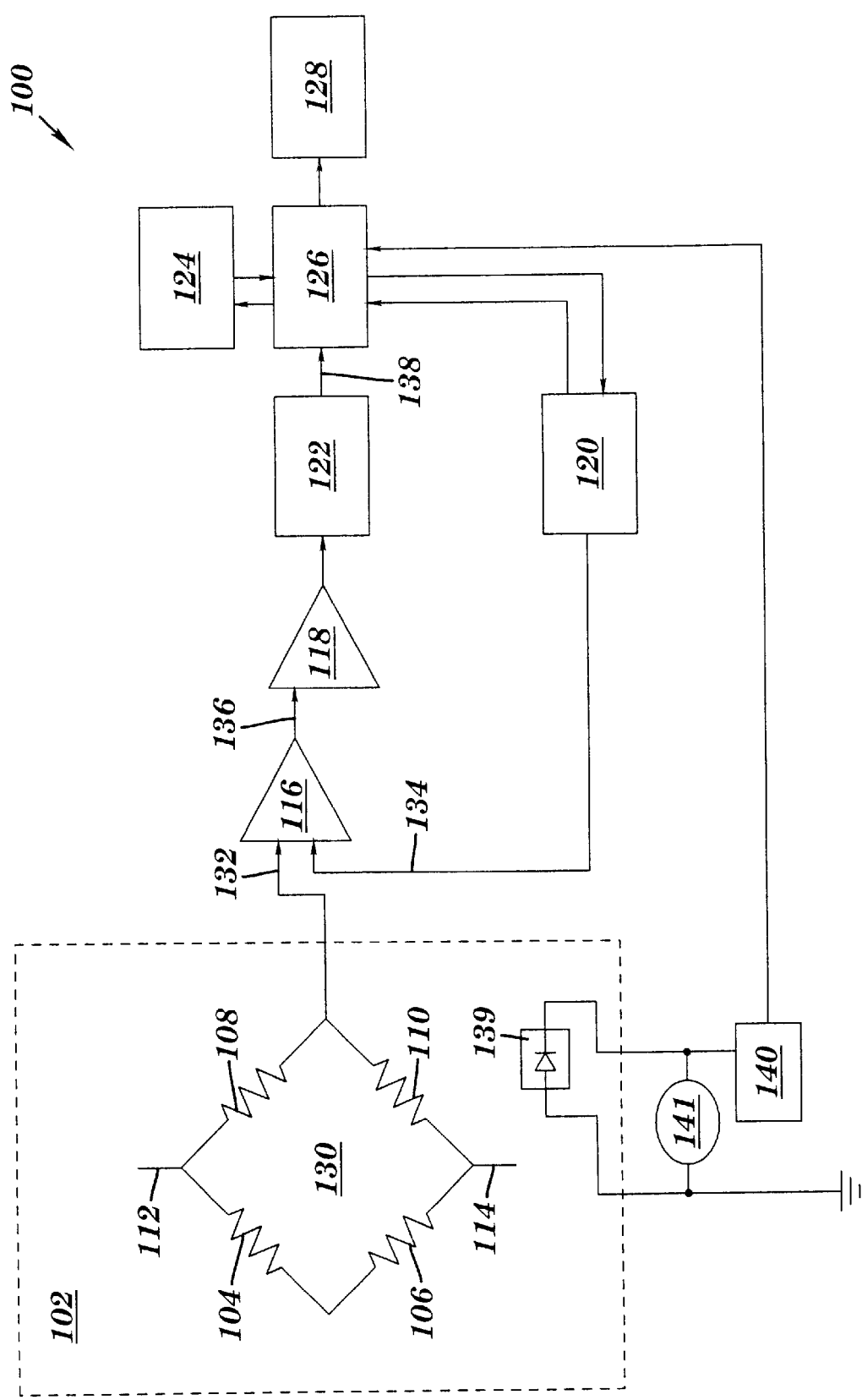
FIG. 1 is a schematic diagram of a detection circuit and associated signal processing devices in accordance with the present invention.

In FIG. 1, a microbolometer detector 102 includes the temperature sensor element or microbolometer 110, which is typically placed in a Wheatstone bridge 130 configuration biased by an electrical potential difference 112, 114 of approximately 2–5 volts DC, with reference resistances 104(array), 106(row), 108(column) which are either heat sunk to a substrate (not shown), or thermally isolated from the substrate in the same manner as the temperature sensor element 110. The column reference 108 and row reference 106 provide partial correction for thermal variations in the substrate, while the array reference 104 (which is not illuminated) provides partial correction for the temperature-varying thermal characteristics of the microbolometer's thermal isolation structure. However, since the reference resistances 104, 106, 108 do not have precisely the same resistance-temperature relationship as the temperature sensor element 110, this correction is not complete. Those skilled in the art will recognize that several different possible detector readout architectures have been demonstrated, such as those described by Parrish, et al., in U.S. Pat. No. 5,756,999, and that the present invention may be adapted to any of a number of analog detector output architectures.

Figure 2:
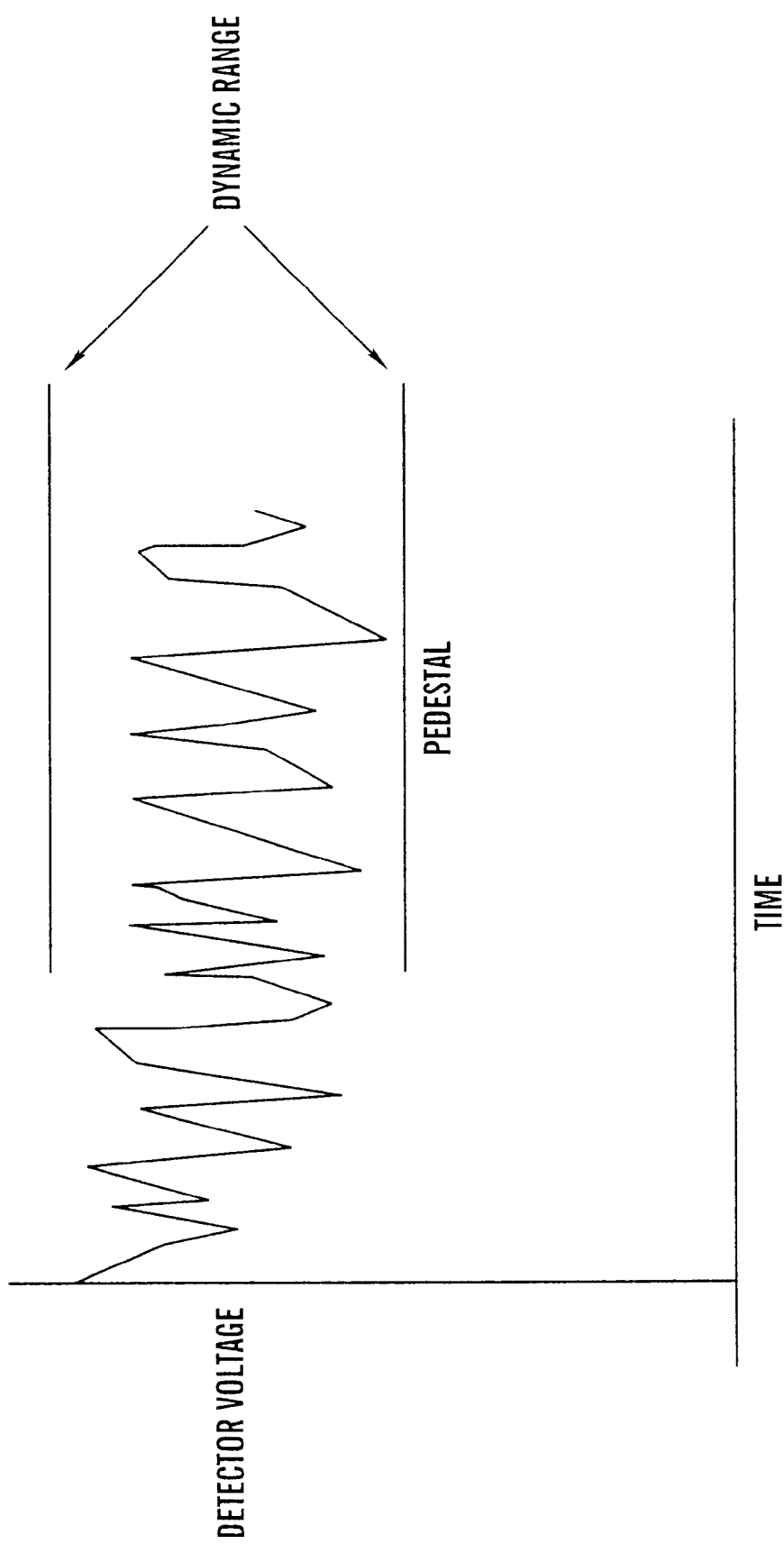
FIG. 2 is a graph illustrating the dynamic range of a detector output at a given temperature and dc offset.
Figure 3:
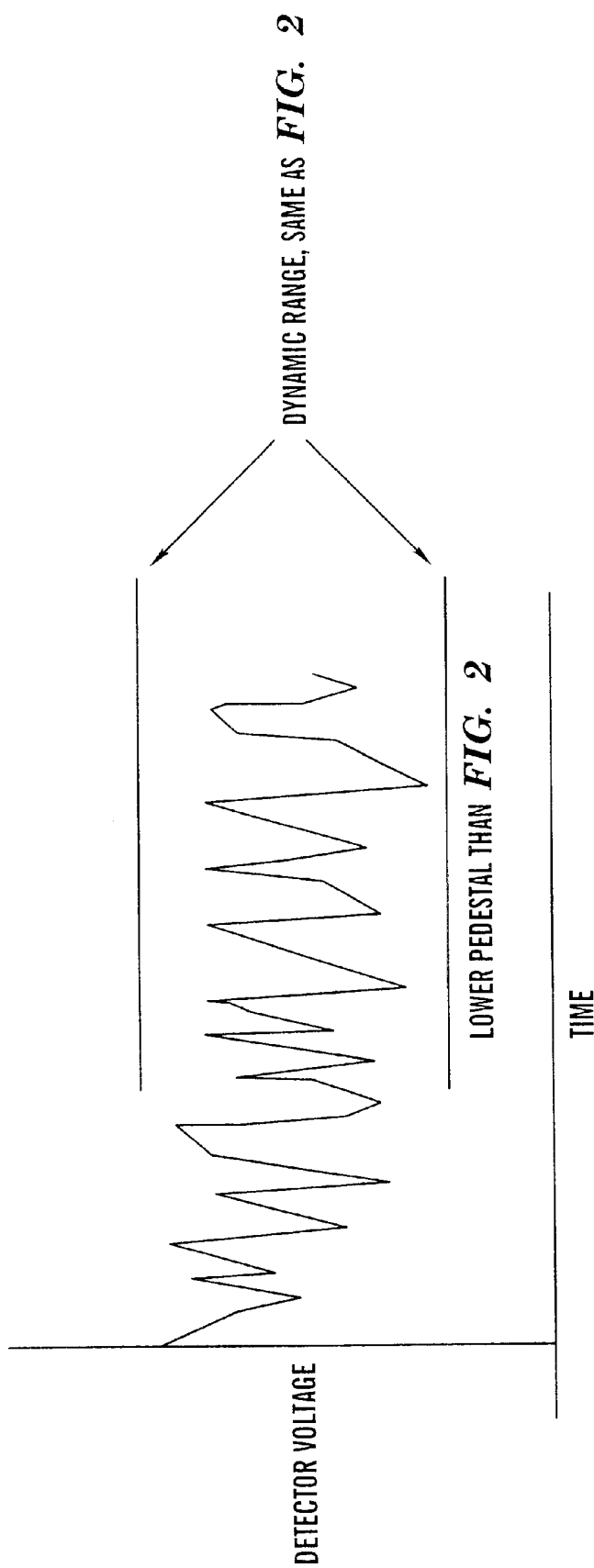
FIG. 3 is a graph illustrating the same dynamic range of a detector output at a second temperature with a second dc offset.

In the example architecture, the analog output of the Wheatstone bridge 130 is input into an analog-to-digital converter (ADC) 122 for digitization of the analog signal. However, since the temperature sensor element 110 output varies as a function of temperature, this signal must be conditioned by a signal conditioning circuit, which includes amplifier stages 116, 118. The function of the amplifier stages 116, 118 is to make the full dynamic signal variation available to the ADC 122. This is because the input sensitivity of the ADC 122 is not well matched to the dynamic variation of the temperature sensor element 110 output; and because the temperature sensor element 110 output has a significant "pedestal," or DC offset, which is not signal information; and because this "pedestal" or DC offset is not fixed from detector to detector. As an example, FIGS. 2 and 3 show a sample microbolometer detector voltage as a function of time (alternatively, this may be viewed as a time multiplexed output of a number of different microbolometer detectors). Note that the dynamic range of the detector is a much smaller voltage potential difference than the absolute voltage output of the biased detector, and that the pedestal voltage forms the difference between the output dynamic range and the peak output voltage.

Figure 4:
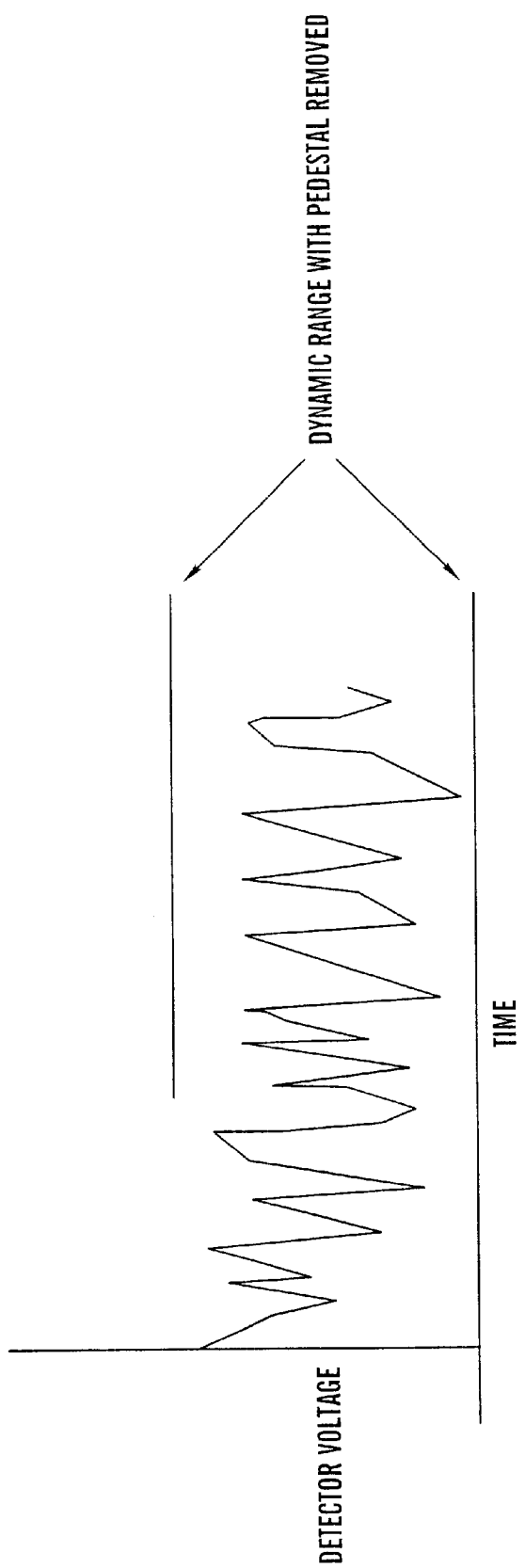
FIG. 4 is a graph illustrating the same dynamic range of a detector output with the dc offset removed.
Figure 5:
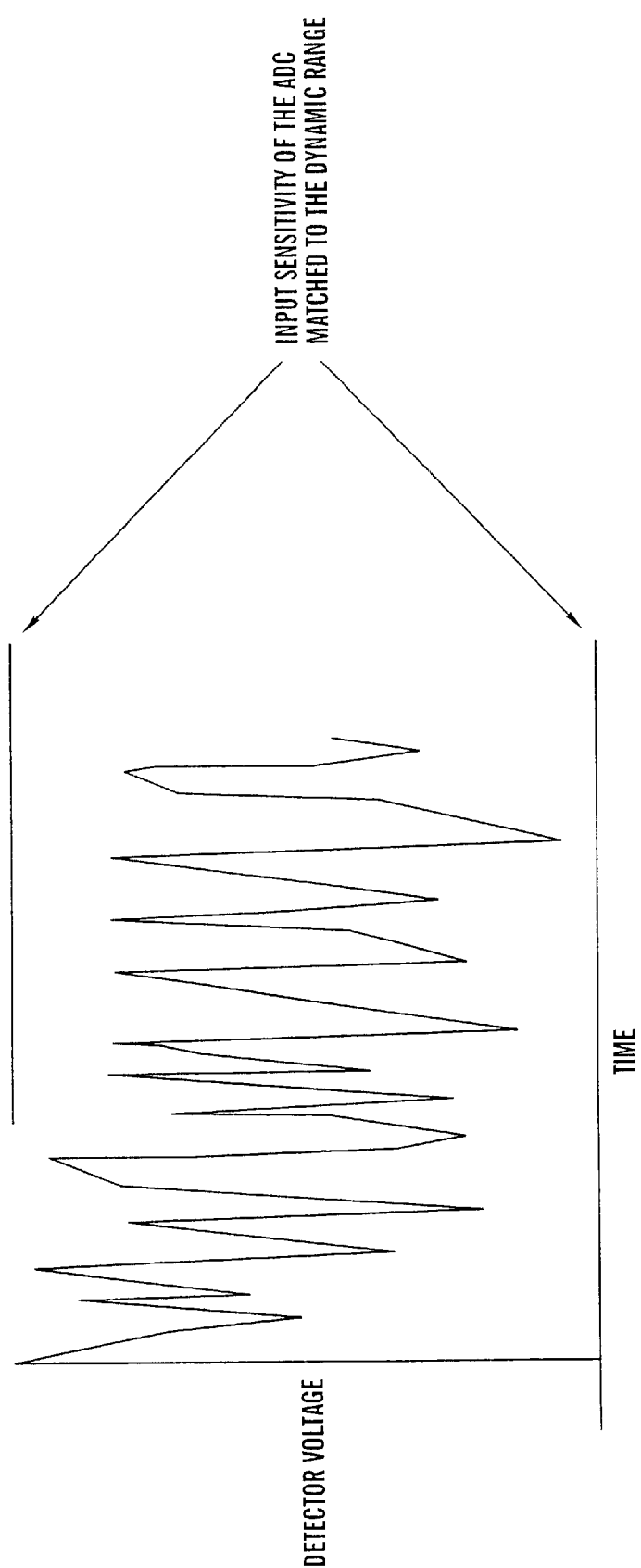
FIG. 5 is a graph illustrating the amplified signal of a detector output when the input sensitivity of the analog-to-digital converter (ADC) is matched to the dynamic range.

FIG. 1 further shows that the signal conditioning employed includes a differential amplifier 116 that removes the signal pedestal. This is shown graphically in FIG. 4. The differential amplifier 116 of FIG. 1 uses a digital input value that indicates the value of the pedestal to be removed. This may vary for each detector of an array, and varies as a function of temperature. The fixed amplifier 118 of FIG. 1 conditions the output of the differential amplifier 116 such that the signal is within the input sensitivity of the ADC 122. The exemplary signal of FIGS. 2–4 is shown in FIG. 5, showing that the dynamic range is now amplified to meet the input sensitivity of the ADC 122.

Following the digitization of the signal, the digital signal is then processed to remove fine non-uniform variations in the output. This is done with the use of digital coefficient memory 124, which provides a correction value corresponding to the difference between the output of an individual detector in the array and the array mean when viewing a flat-field radiation source (such as a blackbody calibration source).

Another correction stage applies a gain value to the signal that corrects the non-uniform response of different detectors in the array to variations in the impinging infrared energy. Together, these correction values remove system fixed pattern noise from the image. However, as will be shown, the correction values are only serviceable for the temperature at which the system was calibrated. The responsivity, $\Re$, of the microbolometer is defined as:

$$\Re = \frac{BV\alpha\varepsilon}{G(1+4\pi f^2\tau^2)} \quad (1)$$

where:

B is the bridge factor $R_L/R_L+R$ $R_L$ is the load resistance

R is the detector resistance

V is the detector bias voltage $\alpha$ is the temperature coefficient of resistance (TCR) of the material $\varepsilon$ is the emissivity of the microbolometer G is the thermal conductance $\tau$ is the thermal time constant, C/G C is the thermal capacitance f is the frequency (frame rate)

The parameter of interest is $\alpha$, the Temperature Coefficient of Resistance (TCR), as it is the determining factor of the temperature variation of the output of the detector if all other factors are held constant. Semiconductors are typically chosen for these types of microbolometer detectors since they possess high TCR values of approximately 2.5%/° C. The disadvantages of too high a TCR are higher (1/f) noise, and variance of the TCR with respect to temperature. Semiconductors possess strong negative nonlinear TCR characteristics. The resistivity of the material is derived from the amount of free charge carriers within the substance, wherein the quantity of these mobile carriers increases with increasing temperature. However, the mobility of these carriers varies inversely to temperature by providing a generally gradual increase in mobile carriers. Thus, the TCR of a material is based on the activation (bandgap) energies of the electrons (the mobile carriers in this case) and is described by:

$$\alpha = -\frac{\Delta E}{KT^2} \quad (2)$$

where:

ΔE is one-half the bandgap energy

K is Boltzmann's constant

T is the absolute temperature (° K.)

As described above, the TCR of a material varies with temperature. Therefore, the response of a detector is also a function of the detector temperature, even when viewing the same object. This variation causes the output of the detector to increase or decrease such that it eventually saturates the ADC 122.

Another important implication of equation (1) is that the detector response is a function of several parameters for which manufacturing tolerances create significant variations from detector to detector. Specifically, the thermal conductance, G, and the thermal capacitance, C, may vary significantly, particularly when the microbolometer is fabricated using micro-machining techniques. These manufacturing tolerances are a significant source of the microbolometer array non-uniform response, termed fixed pattern noise.

Correction of output where the activation energy is nearly constant with respect to temperature will now be addressed. Certain semiconductor materials have activation (bandgap) energy values which are nearly constant with temperature in the temperature region of interest (approximately −10° C. to +50° C.). A noteworthy example of such a material is amorphous silicon, particularly H:α-Si.

One goal of the present invention is to define a corrective gain, M, to multiply by the analog offset value that was established during the calibration process. The gain M is a function of $T_1$, being the focal plane array (FPA) temperature that is sensed by the temperature sensor, and corresponds to the addition of change in the TCR at a reference temperature $\alpha_0(T_0)$. Hence:

$$\alpha_0(T_0) = -\frac{\Delta E}{KT_0^2} \quad (3)$$

$$\Delta\alpha = \alpha_1 - \alpha_0 \quad (4)$$

$$M(T_1)\alpha_0 = \alpha_0 + \Delta\alpha \quad (5)$$

Combining equations (4) and (5):

$$M(T_1) = \frac{\alpha_1}{\alpha_0} \quad (6)$$

Substituting equation (3):

$$M(T_1) = \frac{-\frac{\Delta E}{KT_1^2}}{-\frac{\Delta E}{KT_0^2}} \quad (7)$$

Assuming activation energies are constant with temperature:

$$M(T_1) = \frac{T_0^2}{T_1^2} = \left(\frac{T_0}{T_1}\right)^2 \quad (8)$$

Those skilled in the art will recognize that similar predictable variations in the resistance of the detector material, as a function of temperature, may be identified for non-semiconductor materials such as metals (including e.g., platinum) or organic materials such as proteins. While the physical processes within these alternative materials differ from the physical processes within semiconductors, a similar gain may be defined which may then be employed to correct the temperature variations in the array output.

Microbolometer output may deviate from the ideal temperature function as expressed in the simple gain value shown in equation (8). For instance, the foregoing analysis assumes that the thermal capacitance, C, and the thermal conductance, G, are not strong functions of temperature. However, this is not a valid assumption over large temperature ranges (tens of kelvin). A theoretical analysis based on the actual temperature-dependant thermal capacitance, C, and thermal conductance, G, functions will result in a polynomial expression for the corrective gain, M. In this general case, a second method as described below may be employed.

Correction of microbolometer output for the alternative case where activation energy is a function of temperature is now presented. Certain semiconductor materials do not present a linear response with temperature due to variations in the bandgap energy, as well as other factors. These other factors may include variation in the thermal conductivity or thermal capacitance of the microbolometer isolation structure; variations in surface emissivity with temperature; or variations in the behavior of the multiplexing integrated circuit elements as a function of temperature. In these cases, a more general correction scheme must be employed to remove the pedestal from the analog microbolometer output. Since the key parameters, thermal time constant, τ, and temperature coefficient of resistance, α, are functions of temperature following equations (9), the responsivity equation (1) becomes a function of temperature having polynomial terms. The function, $\Re=f(T)$ may be derived expediently from empirical data.

In addition to temperature variations in the responsivity equation due to material properties such as activation energy, thermal conductivity, G, or enthalpy, the thermal time constant, τ, is a function of microbolometer geometry and therefore manufacturing tolerances. The algorithm for calculation of the pedestal removal function must include microbolometer-specific terms to account for these manufacturing tolerances, namely:

$$C=f(T), G=f(T) \therefore \tau=f(T), \alpha=f(T) \therefore \Re=f(T) \quad (9)$$

The calibration of the microbolometer array 610 (FIG. 6) is accomplished through a process whereby the temperature sensor element 110 (FIG. 1) is exposed to a uniform source of focused infrared energy 622, and the output 132 of each microbolometer 110 is sequentially sensed.

Figure 7:
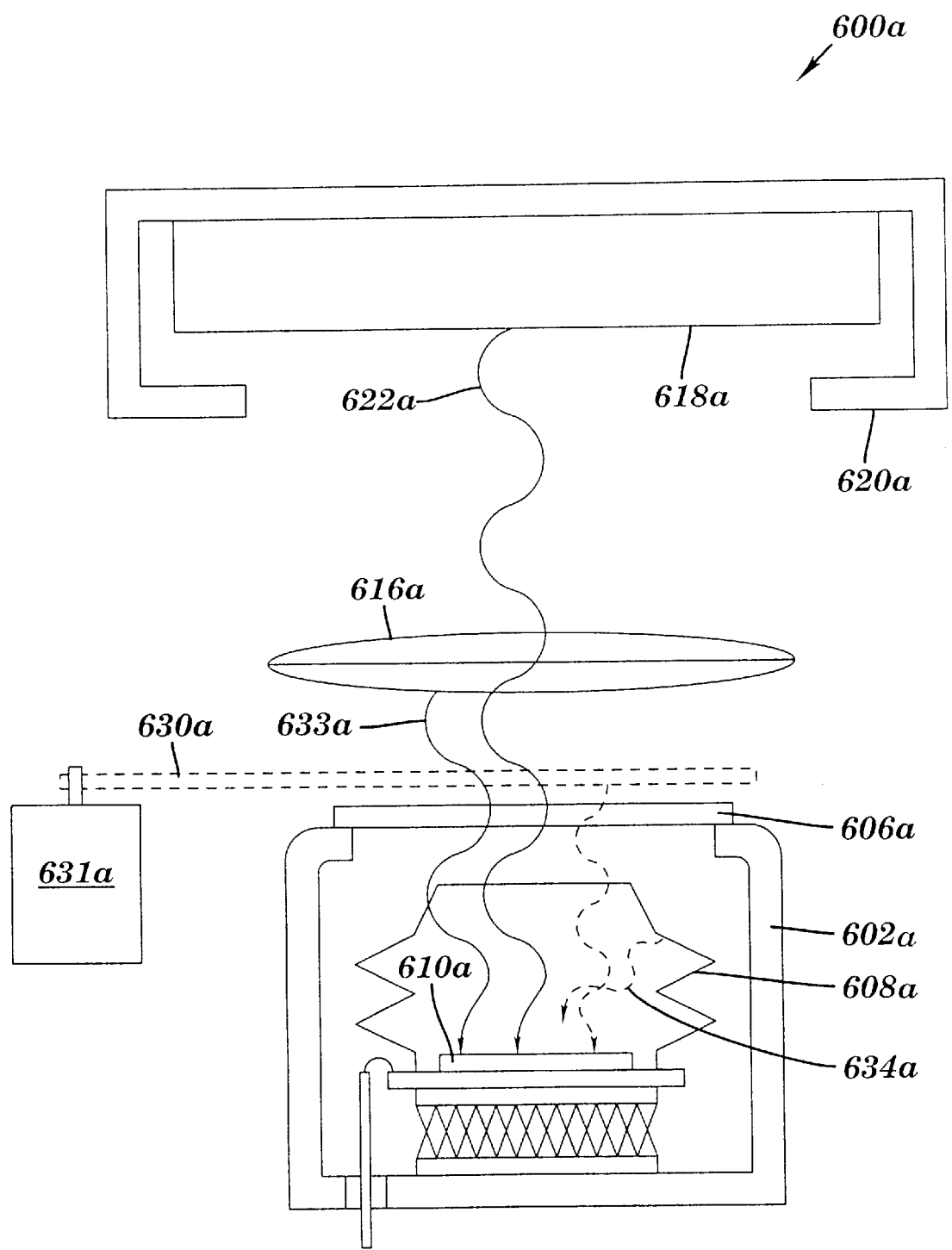
FIG. 7 is a perspective view of a detector-calibration source system showing radiant flux from system components.

FIG. 7 shows components of the microbolometer-calibration source system 600a. A focal plane array 610a is mounted on a multiplexing integrated circuit 612a which is in turn mounted on a Peltier-junction heat engine 604a which provides a temperature control means. The focal plane array 610a is shielded from undesired infrared energy, emitted by vacuum dewar 602a through the use of a cold shield 608*a*. The vacuum dewar 602*a* provides thermal isolation to the internal contents, effectively eliminating convection heat transfer within the enclosed volume. The vacuum dewar 602*a* includes an IR transmissive vacuum window 606*a* so that the desired radiation from the IR blackbody radiation source 618*a*, housed in 620*a*, may emit IR radiation 622*a* that in turn will impinge on the focal plane array 610*a*. An IR refractive lens element 616*a* focuses the IR radiation 622*a* on the focal plane array 610*a*. The focal plane array 610*a* is composed of a plurality of individual microbolometer detectors 102 (FIG. 1), which are preferably arranged in a rectilinear array. A plurality of electrical interconnects 614*a* provide an electrical connection between the internal vacuum space and the external environment. A temperature sensor 624*a* is mounted in intimate contact with the multiplexing integrated circuit 612*a* and/or the focal plane array 610*a* such that the temperature of the focal plane array 610*a* may be sensed externally to the vacuum dewar 602*a*. The temperature sensor 624*a* may be of the thermister type or the diode type. A typical diode variety is known to those skilled in the art as model 2n2222.

The multiplexing integrated circuit 612 is also known as a Read-Out Integrated Circuit (ROIC), and it is typically fabricated as an integrated circuit within the substrate. The function of the ROIC is to provide electrical connections between the temperature sensor element 110 and the reference resistors 104, 106, 108, as shown in FIG. 1, if any are provided. In addition, the ROIC provides bias voltages, which are preferably pulsed to avoid excessive parasitic heating of the microbolometer detector 102. The ROIC further time division multiplexes the output 132 of each microbolometer detector 102, so that each microbolometer detector 102 in the array 610 is biased in sequence, and is output from the focal plane array 610 to one or more electrical interconnects 614 for processing by external circuitry.

The external circuitry provides conditioning of the analog output as described herein, and digitizes the output 132 using an analog-to-digital converter 122 (FIG. 1). The digital output 138 for each microbolometer detector 102 of the array 610 is stored in random access memory 124 for manipulation and processing by a microprocessor 126, using a predetermined instruction code.

The detection circuit and signal processing device system 100 (FIG. 1) is calibrated by thermally stabilizing the focal plane array 610 at a temperature T1 corresponding to the lowest desirable operating temperature using the Peltier-junction heat engine 604 and the temperature sensor 624 for control feedback. Referring now to FIG. 1, the output 132 of the focal plane array microbolometer detector element 102 is input to a low noise differential amplifier 116, the control input 134 of which is attached to a digital-to-analog converter (DAC) 120, such that when a digital control signal is input to the DAC 120, an analog voltage is produced which is then input to the differential amplifier 116. The differential amplifier 116 amplifies the potential difference that is applied to its input terminals. Therefore, the analog control input 134 effectively provides a subtraction value that may subtract some or all of the signal voltage. The output 136 of the differential amplifier 116 is amplified by a fixed amplifier 118, which may be incorporated into the differential amplifier 116, or may be a discrete device. The gain of the amplifiers 116, 118 is selected so that the dynamic range of the microbolometer detector 102 signal is matched to the input sensitivity of the ADC 122. A typical value of the input sensitivity of an ADC 122 is 0–2 volts dc, whereas the typical output 132 of a focal plane array microbolometer detector 102 is 0–5 volts dc. Therefore, the differential amplifier 116 must provide a minimum subtraction voltage of the difference between these two values. If the subtraction voltage is incorrect, the ADC 122 will be saturated. A correct value of the subtraction voltage will cause the ADC 122 to produce an output 138 which is approximately in the center of its digital range. During calibration, the value of the subtraction voltage is determined by arbitrarily selecting a voltage, and then determining if the focal plane array detector element output 132 causes the ADC 122 digital output to be in the center of its range. The process is performed one or more times until the correct subtraction voltage has been determined for each microbolometer detector 102 of the focal plane array 610. The subtraction voltage values so selected are stored so that they may be used to condition the future output of the focal plane array 610. These data are termed analog offset correction values. Since each microbolometer detector 102 has an independently selected analog offset value when viewing a uniform radiation field, the values remove both the microbolometer detector output pedestal, and the spatial fixed pattern noise from the array image.

The above process is repeated at additional temperatures T2, T3 . . . $T_n$, such that a number of analog offset data sets are produced. Preferably, at least one data set is produced for each 1 degree segment of the desired operating range. A curve fit of the analog offset data is performed for the several temperature values so recorded. A curve fitting method is applied to the data so that an equation is derived which produces a good fit with the analytical data. Curve fitting methods such as the least squares method, or any of a number of numerical or graphical methods known to those skilled in the numerical analysis art may be used. The empirical equation is preferably in the form of:

$$\text{offset} = f(T) = AT^3 + BT^2 + CT + D \tag{10}$$

where A, B, C, or D are constants associated with the unique data set. T is the temperature for which the offset is desired.

An exemplary analog offset correction method is described next. The temperature sensor 139 produces an analog voltage output (such as the depicted diode) or a voltage drop (such as a thermister) when biased with a current from current source 141. This voltage is input to an analog-to-digital converter 140 which sends its output to signal processing circuitry or a microprocessor 126 (FIG. 1) which is programmed to apply equation (10) to the temperature value. The output of this equation is then input to the digital-to-analog converter 120 which in turn produces an analog output 134 to the differential amplifier 116, causing the subtraction voltage to be applied to the focal plane array output 132.

To increase the speed of calculation, all offset values for the array may be averaged for each temperature value (T1, T2, etc.), and one average function for the entire array may be computed. However, in order to remove fixed pattern noise from the output, the deviations in the output from microbolometer detector to microbolometer detector must be accounted for. Therefore, a temperature $T_n$ is selected which is approximately in the center of the operating temperature range. The previously described calibration method is applied at this temperature to obtain a data set which contains a baseline value of the analog offset for each microbolometer detector. This average function is applied to the analog offset values as a gain defined as the ratio of the curve fit of the offset function for any arbitrary temperature T, such that T is a temperature within the calibration temperature range; plus a constant K; to the offset average for the mid-range baseline temperature (a constant) plus a constant K, where K is an empirically determined value which is the difference between the digital equivalent (in digital counts) of the minimum offset voltage range and system ground voltage. The constant K has the effect of making the ratio of analog offset values an absolute ratio of a digital representation of voltages.

$$M(T) = \frac{offset_{average}(T_n)}{offset_{average}(T)} \qquad (11)$$

This correction factor is applied to the microbolometer detector-specific offset value for temperature $T_n$ for the microbolometer detector (pixel), such that the new offset value for the individual detector element is as follows:

$$offset_{corrected}(T) = offset_{pixel}(T_n) \times M(T) \qquad (12)$$

Note that each element in the array will have an individually calculated analog offset value. If a microbolometer focal plane array does not have a sufficiently uniform output (such as +/−2% of the array mean response when viewing a uniform source of infrared energy), the foregoing method may not provide sufficient correcting of fixed pattern noise. In these cases, a second method is used as follows: The corrected offset at any arbitrary temperature T may be alternatively determined by selecting a baseline temperature $T_n$ which is preferably in the center of the operational temperature range, and then by computing the difference between the offset value for each detector at this temperature and the offset value for each detector at any other temperature, T, within the operational temperature range. Thus we can define a new function, the offset difference function:

$$offset\_difference\ (T) = offset(T_n) - off\text{-}set(T)$$

To improve the speed of calculation, offset values corresponding to many different detectors may be averaged to create an average offset difference function vs. detector temperature. This function is preferably in the form of a polynomial expression that is determined through the process of empirical curve fitting of calibration data. The fixed pattern noise may then be removed by algebraically adding the offset difference function so created from pixel offset values to obtain a new offset value for each detector element as follows:

$$offset_{corrected}(T) = offset_{pixel}\ (T_n) + offset\_difference\ (T)$$

For example, consider a detector that is exposed to a calibration source of infrared energy and further that the detector substrate is maintained at the calibration temperature, $T_n = 20°$ C. When this example detector is sampled by the sample and hold circuitry, the resulting voltage is 2.5 volts. If the desired mean input voltage sensitivity of the ADC is 2.0 volts, this detector is said to have an offset of 0.5 volts, or 2.5−2.0=0.5 volts. This value (i.e., 0.5 volts) is equivalent to the $offset_{pixel}(T_n)$ in the foregoing equation. If the substrate temperature of this example detector is then changed to 10° C., the resulting voltage would be 3.0 volts owing to the change in the TCR, (equation 2), and its impact on the responsivity as shown in equation 1. Thus, if a new calibration is performed at temperature T (i.e., 10° C.), a new offset voltage would be selected. This new offset voltage is 3.0−2.0=1.0 volts. Thus, the offset difference function would result in a value of 0.5 volts for an input value of 10° C. For example:

$$offset_{corrected}(10°\ C.) = offset_{pixel}(10°\ C.) + offset\_difference(10°\ C.) = 0.5\ volts = 0.5\ volts = 1.0\ volts$$

For the previous example of one detector, this approach is quite straightforward and may be calculated readily. However, for a focal plane array of many thousands of detectors, the computation task becomes quite difficult. To speed the calculation, the offset difference function may be calculated based on the average of many different detectors. The $offset_{pixel}$ term would continue to have the unique, detector specific calibration offset value. For speed of calculation, the per pixel offsets, $offset_{pixel}\ (T_n)$, may be digitized using an analog to digital converter and stored in random access memory. Thus, the system will have one offset difference equation and many per pixel offset values. This method has the benefit of combining detector element unique calibration data with array average data, and does so in a manner which permits rapid calculation.

Still, the foregoing method does introduce error. For instance, if the array average offset difference function resolved to 0.4 volts at 10° C., the detector in the previous example would be assigned an offset value of 0.5+0.4=0.9 volts instead of the required 1.0 volts. Thus, an additional improvement is needed to correct for pixel variances. An additional correction factor may be employed for this purpose. The correction factor is determined by taking the ratio of the offset difference function based on the array average data (offset_difference) and the actual difference between the pixel offset at the calibration temperature, $T_n$, and the pixel offset at temperature T. Note that in order to determine the offset correction factor, two calibrations must be performed, one at $T_n$ and one at T corresponding respectively to the calibration temperature and a second arbitrary temperature which is preferably approximately 10° C. different from the first. For example, consider that for the pixel in the previous example, the two calibrations yield output voltages of 3.0 volts at T and 2.5 volts at $T_n$. Thus, if the center of the input sensitivity range is 2.0 volts, the offset for temperature T would be 1.0 volts and the offset for $T_n$ would be 0.5 volts. If, however, the array had an average offset difference function that resolved to 0.4 volts at T, an error would result as follows:

$$offset_{corrected}(T) = offset_{pixel}(T) + offset\_difference(T) = 0.5\ volts + 0.4\ volts = 0.9\ volts$$

But, as shown previously, the corrected offset voltage is 1.0 volts, an error of 0.1 volts. The correction factor for the offset difference is then equal to the ratio between the actual offset voltages determined by calibration at temperatures T and $T_n$ for each element and the array mean offset difference function:

$$correction\_factor = [offset_{corrected}(T) - offset_{pixel}(T_n)] / offset\_difference(T)$$

For the previous example, this resolves to:

$$correction\_factor = [1.0\ volts - 0.5\ volts] / 0.4\ volts = 0.5\ volts / 0.4\ volts = 1.25$$

The correction factor is applied as follows:

$$offset_{corrected}(T) = offset_{pixel}(T_n) + offset\_difference(T) * correction\_factor$$

To illustrate the application of this function to the example detector element at temperature T:

$$offset_{corrected}(T) = offset_{pixel}(T_n) + offset\_difference(T) * correction\_factor = 0.5\ volts = 0.4\ volts * 0.25 = 1.0\ volts$$

One correction factor and one baseline calibration value ($offset_{pixel}$) is used for each pixel in the focal plane array for all operational temperatures; one offset difference function is used for the entire array to describe the variation in offset as a function of temperature. Thus, a combination of per pixel calibration data (both an offset and a gain) and a mean polynomial function is used to provide an accurate means of calculating the required analog offset at any temperature and for any detector element in an array. The advantage of this system over the simple offset function of equation (10) is that for each frame of data comprising tens of thousands of pixels read in approximately 1/60th of a second, only one polynomial function need be calculated, all other calculations are simple multiplication (the gain or correction factor term) and a simple addition (the baseline calibration offset) need occur. This permits the application of an offset function on a real time basis to analog video from the focal plane array.

Rapid readiness of the detection and correction technique from system start-up will result from application of the correction method discussed herein. It is another advantage of the present invention to minimize the start-up time of the microbolometer detector system by one of two methods: temperature stabilization at the initial temperature; or elimination of the temperature stabilization requirement.

The foregoing calculation method for offset permits the application of additional terms to address the other objects of the invention. It is an advantage of the present invention that the microbolometer detector output may be easily modulated to compensate for large deviations in the magnitude of impinging radiation. Referring now to equation (1), the detector responsivity may be varied by changing the voltage V, or sampling frequency $f$. Alternatively, the responsivity may be mechanically varied through vignetting. Each of these methods requires a different analog offset value in order to assure that the detector output is well matched to the ADC input sensitivity and hence not over- or undersaturated. For instance, when viewing a hot object such as a flame, the output of the detector increases such that saturation of the ADC may occur. In these cases, it is desirable to reduce the sensitivity of the microbolometer array through either reduction in the time that each detector element is sampled using the sample and hold circuit, or reduction of the bias voltage, or increase in the applied analog offset, or any combination of these three methods. Since the system for compensating for thermal fluctuations of the detector permits real time calculation of analog offsets, we may calculate a new offset value to compensate for adjustments to the input sensitivity. The best way to do this is to perform a series of calibrations, parametrically adjusting the sampling time, bias voltage or degree of mechanical vignetting, recording the resulting analog offset values which satisfy the requirements that the output of the microbolometer be well matched to the input sensitivity range of the ADC, and curve fitting the results. Following this process, an expression may be created in a polynomial form which has input parameters of sampling time, voltage and/or degree of mechanical vignetting and which outputs the offset difference function. Thus, the new equation for offset is:

$$\text{offset}_{corrected}(T) = \text{offset}_{pixel}(Tn) + \text{offset\_difference}(T, f, V, \text{mechanical vignetting}) * \text{correction\_factor}$$

The analog offset may be applied in this manner, or may be applied as an additional correction factor to the entire right side of the offset function:

$$\text{offset}_{corrected}(T) = \text{correction\_factor}^2(T, f, V, \text{mechanical vignetting}) * [\text{offset}_{pixel}(Tn) = \text{offset}_{13}\text{difference}(T) * \text{correction\_factor}]$$

Large deviations in the temperature of system components such as the lens, dewar window, cold shield, or other components which are within "view" of the detectors give rise to deviations in the output of the microbolometer elements, and may cause the ADC to be under- or oversaturated. In the present invention, temperature sensors are placed on these components to record their temperature. This temperature information is used in conjunction with offset calibrations to correlate component temperature with the required analog offset voltage necessary to bring the microbolometer output to the center of the input sensitivity range of the system ADC. This correlation is curve fit such that a series of mathematical functions of analog offset voltage vs. component temperature are created. These functions may be applied to the analog offset function above to provide additional correction utility to the offset function. An example function is presented:

$$\text{offset}_{corrected}(T) = \text{offset}_{pixel}(Tn) + \text{offset\_difference}(T, f, V, \text{mechanical vignetting}, T_{lens}, T_{coldshield}, T_{dewar\ window}) * \text{correction\_factor}$$

Referring to FIG. 1, the hardware used in these methods is briefly described. The temperature value, which is digitized using the analog-to-digital converter (ADC) 140, is input to a microprocessor 126 which has random access memory 124 connected to it using a digital data bus. The microprocessor 126 reads the calibration data from the random access memory 124 and applies the digital temperature value to equations (11) and (12), producing a new corrected offset value data set for the microbolometer detector 102. This is stored in random access memory 124 and is applied to correct the analog output 132 of the microbolometer detector 102.

Figure 8:
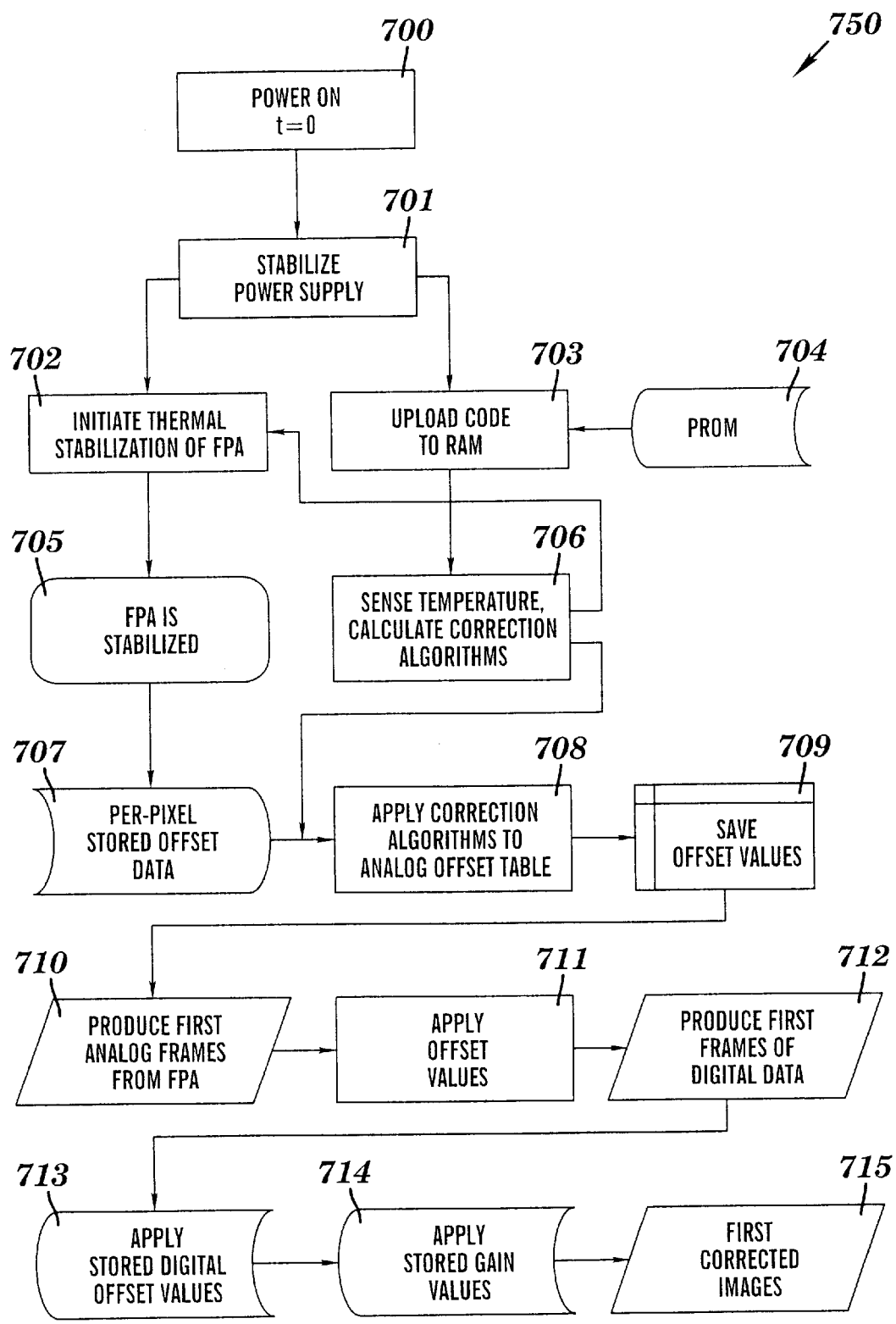
FIG. 8 shows a flow diagram for analog offset interpolation with thermal stabilization of the focal plane array.

The correction method employing temperature stabilization at the initial temperature is presented first. Referring now to FIG. 8, a process flow scheme 750 is shown for the initial start-up condition wherein the desire is to apply heating or cooling to the focal plane array (FPA) to meet some predetermined operation temperature.

Prior to use, the focal plane array is calibrated such that an analog offset data set and curve-fit equation are stored in memory.

Upon system power-up 700, several functions are performed. In addition to the necessary power supply stabilizations 701, microprocessor boot-up routines 703, 704 etc., the microbolometer FPA is heated or cooled 702 to bring it to a specific predetermined temperature corresponding to its calibration data set. The thermal stabilization may be performed, e.g., using a Peltier-junction heat engine, which performs this function in approximately 10–60 seconds, depending on the difference between the initial temperature and the desired temperature. Alternatively, the FPA temperature is sensed 706 at power-up, and the temperature control means stabilizes the FPA at whatever arbitrary temperature that the FPA happens to be.

Simultaneous to the thermal stabilization 705, the temperature sensor is read 706 by the computer and an algorithm is applied to correct 708 the analog output of the FPA to bring its peak-to-peak voltage output into the sensitivity range of the analog-to-digital converter (ADC) 122 (FIG. 1). The predetermined per-pixel stored offset data 707 is used in the correction algorithm 708 to calculate analog offset values which are stored in memory 709.

As the first analog frames are produced 710 by the focal plane array (FPA), the previously calculated offset values are applied 711 to these frames. The resulting signal is then converted to digital data 712, and when used, the stored digital offset values are applied 713. Finally, the previously stored gain values are applied 714, yielding the corrected images 715.

The system depicted in FIG. 8 presumes that the compensation scheme is applied only at start-up. This system requires continuous stabilization of the FPA temperature, thus consuming system power at a greater rate than an unstabilized system.

Figure 6:
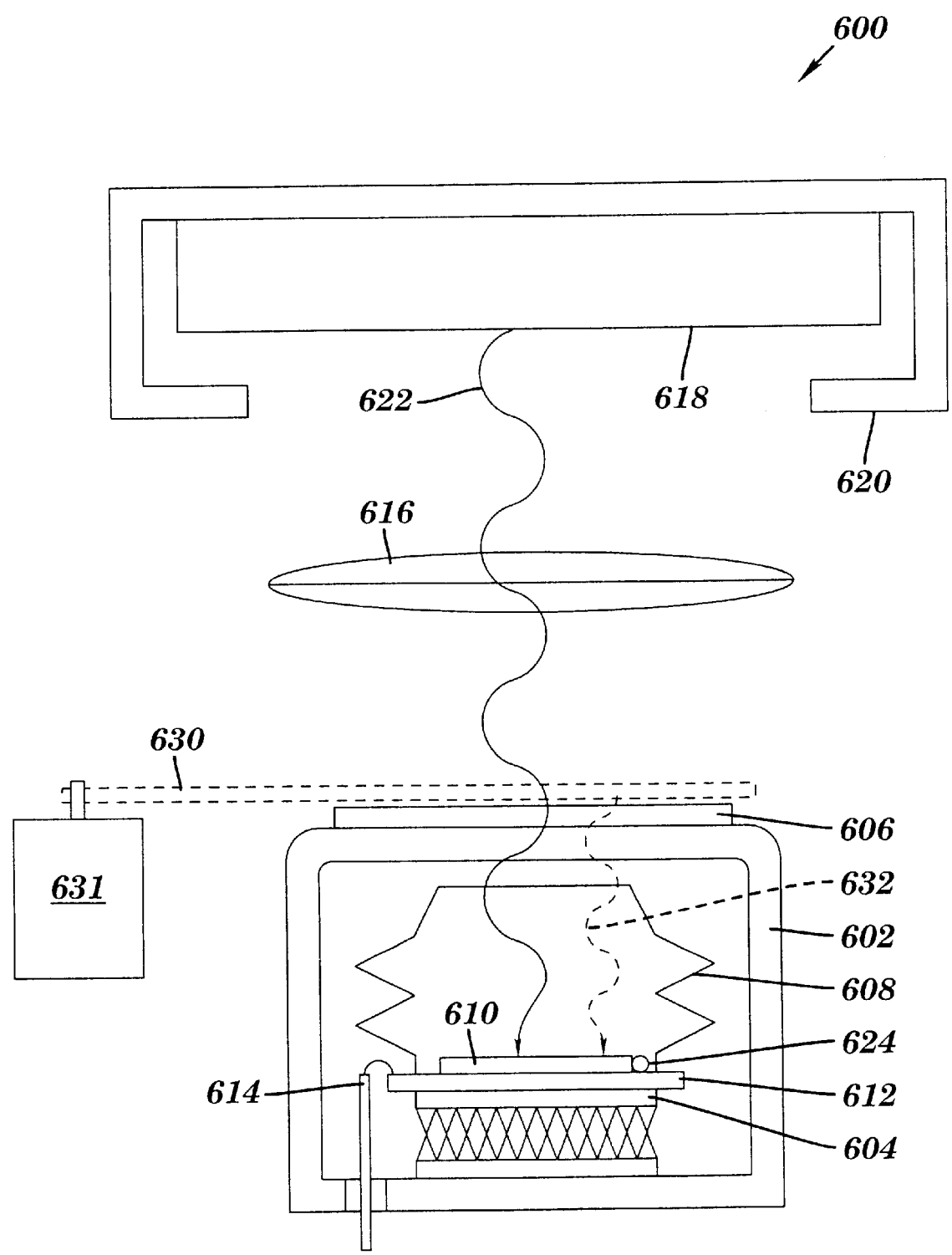
FIG. 6 is a perspective view of a detector-calibration source system.

An alternative approach, namely elimination of the temperature stabilization requirement, or passive temperature stabilization is now discussed. In order to eliminate the temperature stabilization device (for example, the Peltier-junction heat engine), the circuit board is mounted on a relatively large thermal mass, such as a block of copper, having a mass of approximately 10 grams or more. The thermal mass absorbs energy and decreases the slope of the temperature/time curve as energy is input to the focal plane array 610 (FIG. 6). The temperature of the focal plane array 610 is sensed, and the offset correction scheme is applied to the stored data sets, as previously described. However, as the focal plane array 610 changes temperature, new calibration data sets are calculated and applied to the focal plane array's individual detector analog output 132 (FIG. 1). This process is repeated whenever the temperature of the array 610 deviates by a predetermined increment, such as 0.015° C., or as much as 1° C. To minimize the impact of the temperature excursions of the focal plane array 610, a process know to those skilled in the art as automatic gain control is applied to the digital output 138 of the ADC 122 (FIG. 1). This effectively eliminates noise for temperature excursions as great as 1° C.

Figure 9:
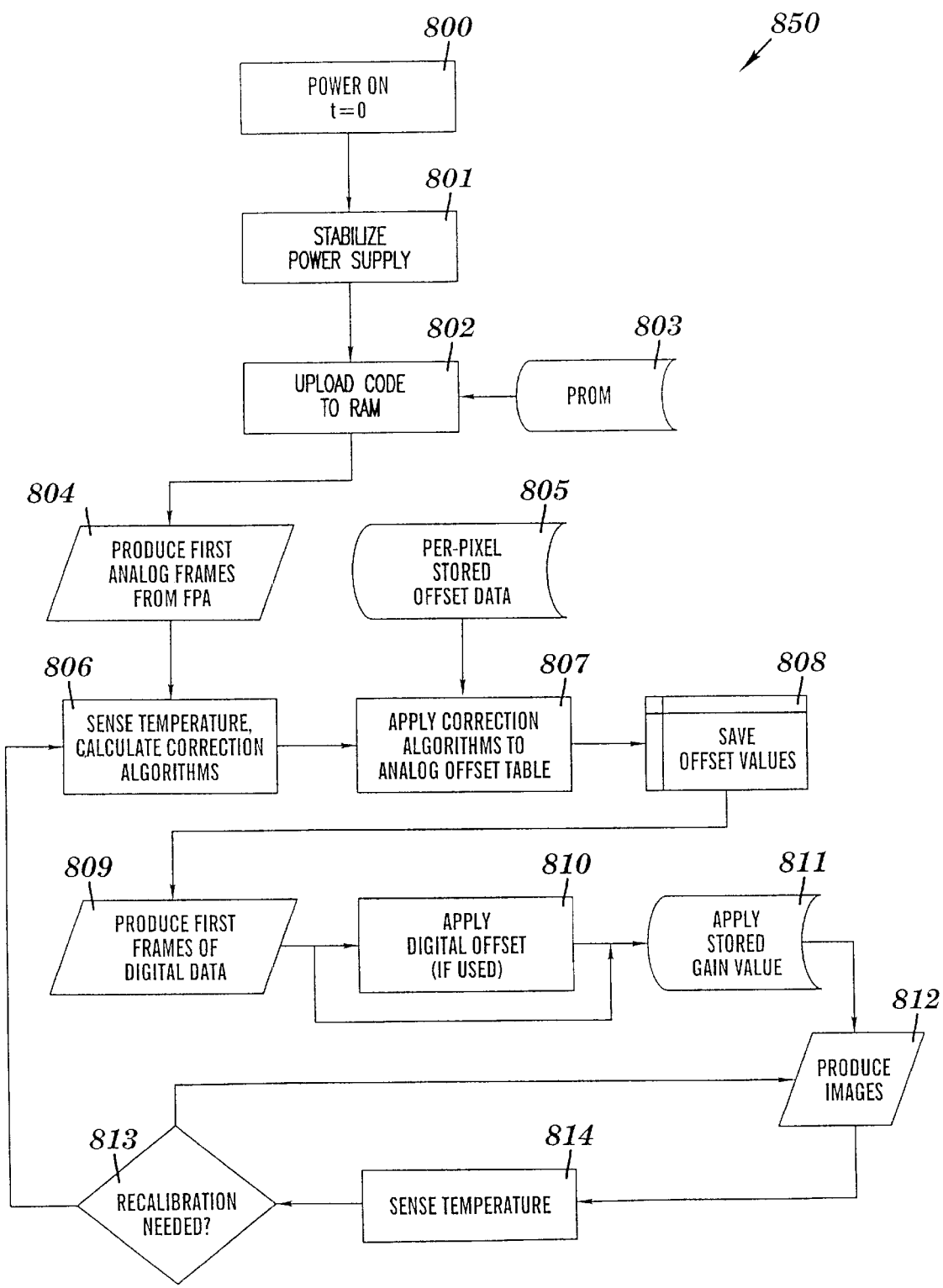
FIG. 9 shows a flow diagram for analog offset interpolation without thermal stabilization of the focal plane array.

FIG. 9 describes a system wherein the FPA temperature is allowed to drift (i.e., it is not stabilized), and repeated temperature compensation adjustments of the FPA output are performed to keep the FPA output within the range of the ADC. While this system doesn't require stabilization, it does require additional computing capacity. Thus, a design trade-off study must be performed to determine which method is appropriate for a given application.

Referring now to FIG. 9, the process flow scheme 850 is shown for the initial start-up condition wherein the desire is to avoid heating or cooling the focal plane array (FPA) to meet some predetermined operation temperature.

Prior to use, the focal plane array is calibrated such that an analog offset data set and curve-fit equation are stored in memory. Upon system power-up 800, several functions are again performed. The necessary power supply stabilizations 801, and microprocessor boot-up routines 802, 803 etc., are performed.

In this case, as the first analog frames are produced 804 by the focal plane array, the temperature is sensed and correction algorithms are calculated 806. At this time, the decision 813 whether or not recalibration is required is made based on whether the sensed temperature 814, has deviated by a predetermined amount from some nominal value. If recalibration is required, the correction algorithms are recalculated at 806.

The predetermined per-pixel stored offset data 805 are used in the correction algorithm 807 to calculate the analog offset values which are stored 808 in memory.

The resulting signal is then converted 809 to digital data, and the previously stored gain values are applied 811, yielding the corrected images 812.

In the event that the sensed 814 focal plane array temperature does not change significantly, recalibration 813 will not be required, and the digital offset 810 applied to the data will remain unchanged.

However, if the focal plane array changes temperature, these changes are detected 814 and recalibration 813 of the data sets and correction algorithms is performed. This updated information is then used to apply a different analog offset 808 to the signal. This process is repeated whenever the temperature of the array deviates by a predetermined increment.

Further refinements to this system include the addition of a cold shield 608 (FIG. 7) so that variations in the temperature of the container that houses the FPA 610 do not perturb the validity of the calibration values.

Another improvement to the system includes the addition of a moveable calibration source 630 mounted on a servo motor or other actuator 631. The moveable calibration source emits spatially uniform infrared energy and is used when image non-uniformity (termed fixed pattern noise), is to be removed from the image signal. This noise will typically include thermal noise from the change in temperature of the cold shield 608, dewar 602 or vacuum window 606, all of which is not completely corrected for through the analog offset correction algorithm scheme. It is used as follows: The calibration source 630 is placed so as to block the impinging energy 622, and such that the impinging energy 632 from the calibration source illuminates the focal plane array. In this state the digitized output of each detector element in the focal plane array 610 is compared to the average output of all array elements. A digital subtraction or addition value is calculated such that the output of the array is uniform once the correction value is applied. The calibration source 630 is removed when the process is over so that the scene thermal energy 622 again impinges the detector. This process may be repeated as needed to maintain a low-noise image.

Following digitization of the data, the data is output to a video processor 128 (FIG. 1) which converts the data into a usable form, such as output to a machine vision system in a conditioned digital form, or output to a monitor such as a liquid crystal display (LCD) or cathode ray tube (CRT), for viewing by the system user. The entire array is preferably output sequentially at a frame rate in excess of 15 frames per second if smooth imaging of movement is desired. Alternatively, the array may be readout only one time for still imagery, or at some other frame rate as required by the need for thermal imaging data.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

We claim:

1. A method of correcting the output of a microbolometer detector system, said method comprising:

providing a microbolometer detector system for operation in an ambient temperature range, said microbolometer detector system further comprising at least one microbolometer detector, and an apparatus for reducing thermal noise;

providing a temperature stabilization system for correcting the temperature variation of the microbolometer detector;

providing an electronic system for conditioning the output of the microbolometer detector wherein the electronic system:

responds to variations in a radiant flux signal from a source;

modulates the sensitivity of the microbolometer detector to the variations in the radiant flux signals;

converts the output from the microbolometer detector from an analog signal to a digital signal using an analog-to-digital converter; and limits the output from the microbolometer detector so that the microbolometer detector output remains within an input sensitivity range of the analog-to-digital converter; and applying a correction factor to the output signal of the microbolometer detector.

2. The method of claim 1, wherein the ambient temperature range is between approximately −10° C. and +50° C.

3. The method of claim 1, wherein the apparatus for reducing thermal noise is selected from the group consisting of a lens, a dewar window, and a cold shield.

4. A method of correcting the output of a microbolometer detector system, said method comprising:

providing a microbolometer detector system for operation in an ambient temperature range, said microbolometer detector system further comprising at least one microbolometer detector, and an apparatus for reducing thermal noise;

said apparatus for reducing thermal noise being selected from the group consisting of a lens, a dewar window, and a cold shield;

providing a temperature stabilization system for correcting the temperature variation of the microbolometer detector;

providing an electronic system for conditioning the output of the microbolometer detector; and applying a correction factor to the output signal of the microbolometer detector wherein applying the correction factor to the output signal of the microbolometer detector decreases effects of temperature variations in the lens, dewar window, or cold shield.

5. A method of correcting the output of a microbolometer detector system, said method comprising:

providing a microbolometer detector system for operation in an ambient temperature range, said microbolometer detector system further comprising at least one microbolometer detector, and an apparatus for reducing thermal noise;

providing a temperature stabilization system for correcting the temperature variation of the microbolometer detector;

providing an electronic system for conditioning the output of the microbolometer detector wherein the electronic system performs an algorithm to calculate a corrected offset value based on the difference between an individual microbolometer detector temperature and a baseline temperature; and applying a correction factor to the output signal of the microbolometer detector.

6. The method of claim 5, wherein the baseline temperature is approximately at the center of the operational temperature range of the microbolometer detector.

7. The method of claim 5, wherein an average offset difference function vs. detector temperature is calculated from a plurality of offset values corresponding to different microbolometer detectors.

8. The method of claim 7, wherein the average offset difference function is a polynomial expression.

9. The method of claim 8, wherein the average offset difference function is a polynomial expression determined via empirical curve fitting of calibration data for the plurality of microbolometer detectors.

10. The method of claim 9, wherein thermal noise is substantially removed by calculating a new offset value, said new offset value the result of algebraically combining the offset difference function with a pixel offset value for each microbolometer detector.

11. The method of claim 10, wherein the offset difference function is calculated based on the average of a plurality of different microbolometer detectors.

12. The method of claim 11, wherein the pixel offset values are stored in a memory.

13. The method of claim 9, wherein a pixel variance correction factor is determined by calculating the ratio of the offset difference function, based on microbolometer detector data, and an actual difference between the pixel offset at a calibration temperature and the pixel offset at a second temperature.

14. The method of claim 13, wherein the pixel variance correction factor is applied to the plurality of microbolometer detectors on a real time basis.

15. A method of correcting the output of a microbolometer detector system, said method comprising:

providing a microbolometer detector system for operation in an ambient temperature range, said microbolometer detector system further comprising at least one microbolometer detector, and an apparatus for reducing thermal noise;

providing a temperature stabilization system for correcting the temperature variation of the microbolometer detector;

providing an electronic system for conditioning the output of the microbolometer detector;

providing a system for varying the responsivity of the microbolometer;

applying a correction factor to the output signal of the microbolometer detector.

16. The method of claim 15, wherein the apparatus for reducing thermal noise is selected from the group of system components consisting of a lens, a dewar window, and a cold shield.

17. The method of claim 15, wherein varying the method of varying the responsivity is selected from the group consisting of: varying the applied bias voltage, varying the sampling frequency, or varying the degree of mechanical vignetting applied to the microbolometer detector.

18. The method of claim 17, wherein an offset value is calculated by performing a series of calibration steps:

adjusting the sampling time, bias voltage, or degree of mechanical vignetting;

recording the resulting analog offset values which satisfy the requirement that the output of the microbolometer detector be well matched to the input sensitivity range of a analog-to-digital converter; and curve fitting the results.

19. The method of claim 18, further comprising the step of applying an analog offset correction factor.

20. The method of claim 18, further compensating for variations in the temperature of system components, said steps comprising:

providing temperature sensors operationally connected to said system components;

monitoring said temperature sensors;

correlating system component temperatures with an analog offset voltage required to bring said microbolometer detector output to the approximate center of the input sensitivity range of the analog-to-digital converter;

curve fitting the correlated system component temperatures and the analog offset voltages; and producing at least one mathematical function of analog offset voltage vs. system component temperature.

21. An apparatus for correction of a microbolometer detector output, said apparatus comprising:

at least one microbolometer detector;

a thermal noise reduction system operationally connected to said at least one microbolometer detector;

an electrical reference circuit connected to said at least one microbolometer detector;

an output from said electrical reference circuit connected to an input of a signal conditioning circuit wherein the signal conditioning circuit further comprises:

a differential amplifier;

a first reference source;

a signal processor;

an output from said electrical reference circuit connected to a first input of said differential amplifier;

an output from said first reference source connected to a second input of said differential amplifier; and an output from said signal processor connected to said first reference source, wherein the output of the first reference source is determined by the signal processor; and an output from said signal conditioning circuit connected to a display device.

22. The apparatus of claim 21, further including:

a temperature sensor operationally connected to said microbolometer;

a second reference source operationally connected to said temperature sensor;

an analog-to-digital converter operationally connected to said temperature sensor, said second reference source, and to said signal processor.

23. The apparatus of claim 21, wherein the first reference source is a voltage source.

24. The apparatus of claim 23, wherein the voltage source is a digital-to-analog converter.

25. An apparatus for correction of a microbolometer detector output, said apparatus comprising:

at least one microbolometer detector;

a thermal noise reduction system operationally connected to said at least one microbolometer detector;

an electrical reference circuit connected to said at least one microbolometer detector;

an output from said electrical reference circuit connected to an input of a signal conditioning circuit wherein the signal conditioning circuit contains an algorithm to calculate a corrected offset value based on the difference between an individual microbolometer detector temperature and a baseline temperature; and an output from said signal conditioning circuit connected to a display device.

26. The apparatus of claim 25, wherein the baseline temperature is approximately at the center of the operational temperature range of the microbolometer detector.

* * * * *